(12) United States Patent
Chiang et al.

(10) Patent No.: US 6,842,401 B2
(45) Date of Patent: Jan. 11, 2005

(54) SONAR BEAMFORMING SYSTEM

(75) Inventors: Alice M. Chiang, Weston, MA (US);
Steven R. Broadstone, Woburn, MA (US)

(73) Assignee: TeraTech Corporation, Burlington, MA (US)

( * ) Notice: Subject to any disclaimer, the term of this patent is extended or adjusted under 35 U.S.C. 154(b) by 122 days.

(21) Appl. No.: 09/909,141

(22) Filed: Jul. 19, 2001

(65) Prior Publication Data

US 2002/0071345 A1 Jun. 13, 2002

Related U.S. Application Data

(63) Continuation-in-part of application No. 09/828,266, filed on Apr. 6, 2001, now Pat. No. 6,552,964.
(60) Provisional application No. 60/195,587, filed on Apr. 6, 2000.

(51) Int. Cl.[7] ................................................ H04B 1/02

(52) U.S. Cl. ....................................................... 367/138

(58) Field of Search .......................... 367/88, 133, 134, 367/7, 138, 104

(56) References Cited

U.S. PATENT DOCUMENTS

| | | |
|---|---|---|
| 3,928,839 A | 12/1975 | Warner et al. |
| 4,034,483 A | 7/1977 | Bernstein et al. ............ 35/10.4 |
| 4,152,678 A | 5/1979 | Shott et al. .................. 333/150 |

(List continued on next page.)

FOREIGN PATENT DOCUMENTS

| | | |
|---|---|---|
| EP | 0 593 822 A1 | 4/1994 |
| GB | 2 130 798 A | 6/1984 |

OTHER PUBLICATIONS

Takeuchi, Y., "Coded Excitation for Harmonics Imaging," IEEE Ultrasonics Symposium, 1433–1436 (1996).

Tanaka, T., et al., "Digital Signal Processor for Digital Multi Beam Forming Antenna in Mobile Communications," ATR Optical and Radio Communication Research Laboratories, 1507–1511 (Aug. 6, 1994).

Beetner, D.G., and Arthur, M.R., "Generation of Synthetic–Focus Images from Pulse–Echo Ultrasound Using Difference Equations," IEEE Transactions on Medical Imaging, vol. 15, No. 5, 665–672 (Oct. 1996).

Broadstone, S.R., and Arthur, M.R., "Determination of Time–of–Flight Surfaces Using the Methods of Moments" IEEE, Transactions on Medical Imaging, 10(2) 173–179 (Jun. 1991).

(List continued on next page.)

*Primary Examiner*—Daniel T. Pihulic
(74) *Attorney, Agent, or Firm*—Bowditch & Dewey, LLP

(57) ABSTRACT

The present invention relates to sonar beamforming systems and methods, using a forward-looking sonar having transmit and receive transducer arrays with a beamforming device and at least one side-looking sonar having dynamically range-focused beams. The forward-looking sonar provides for obstacle avoidance and undersea survey. The systems include one-dimensional transmit and receive transducer arrays with beamforming electronics, a computing controller such as, for example, a personal computer host controller. The arrays and beamforming electronics can be packaged in a hermetically sealed housing unit and mounted in Unmanned Underwater Vehicles (UUV). The side-looking sonar system includes for example, 32-element, one-dimensional arrays that are mounted on either side of the UUVs. Further, a downward looking Bathymetric sonar may be mounted on the underside of the vehicle for high-resolution mapping.

32 Claims, 7 Drawing Sheets-

U.S. PATENT DOCUMENTS

| | | | |
|---|---|---|---|
| 4,159,462 A | | 6/1979 | Rocha et al. |
| 4,163,958 A | * | 8/1979 | Gerard |
| 4,207,620 A | * | 6/1980 | Morgera .................. 367/88 |
| 4,227,417 A | | 10/1980 | Glenn .................. 73/625 |
| 4,233,678 A | | 11/1980 | Brady, III .................. 367/122 |
| 4,241,608 A | | 12/1980 | Dees et al. .................. 73/606 |
| 4,244,037 A | | 1/1981 | Jelks .................. 367/121 |
| 4,245,333 A | | 1/1981 | Jelks .................. 367/121 |
| 4,253,168 A | | 2/1981 | Petrosky et al. .................. 367/123 |
| 4,254,662 A | | 3/1981 | Kuroda et al. .................. 73/626 |
| 4,267,584 A | | 5/1981 | McKeighen et al. .................. 367/11 |
| 4,274,148 A | | 6/1981 | Hullenaar .................. 367/122 |
| 4,277,787 A | | 7/1981 | King .................. 343/100 |
| 4,307,613 A | | 12/1981 | Fox .................. 73/626 |
| 4,313,184 A | | 1/1982 | Jarman et al. .................. 367/88 |
| 4,336,607 A | | 6/1982 | Hill et al. .................. 367/123 |
| 4,401,957 A | | 8/1983 | McKeighen et al. .................. 333/165 |
| 4,404,665 A | * | 9/1983 | Kits van Heyningen .... 367/100 |
| 4,464,726 A | | 8/1984 | Chiang |
| 4,544,927 A | | 10/1985 | Kurth et al. .................. 343/373 |
| 4,616,231 A | | 10/1986 | Autrey et al. .................. 342/374 |
| 4,947,176 A | | 8/1990 | Inatsune et al. .................. 342/173 |
| 4,992,999 A | | 2/1991 | Yerby et al. .................. 367/130 |
| 5,014,250 A | | 5/1991 | Hadderingh .................. 367/124 |
| 5,029,144 A | | 7/1991 | Griffin .................. 367/11 |
| 5,030,953 A | | 7/1991 | Chiang .................. 341/172 |
| 5,031,625 A | | 7/1991 | Higashiizumi et al. |
| 5,089,983 A | | 2/1992 | Chiang |
| 5,126,962 A | | 6/1992 | Chiang |
| 5,200,755 A | | 4/1993 | Matsuda et al. .................. 342/158 |
| 5,200,931 A | * | 4/1993 | Kosalos et al. .................. 367/88 |
| 5,228,007 A | | 7/1993 | Murakami et al. .................. 367/103 |
| 5,235,558 A | | 8/1993 | Woodsum et al. .................. 367/92 |
| 5,276,452 A | | 1/1994 | Schuss et al. .................. 342/371 |
| 5,309,409 A | | 5/1994 | Jones et al. .................. 367/103 |
| 5,343,211 A | | 8/1994 | Kott .................. 342/379 |
| 5,386,830 A | | 2/1995 | Powers et al. |
| 5,412,618 A | * | 5/1995 | Gilmour .................. 367/88 |
| 5,517,537 A | | 5/1996 | Greene et al. .................. 376/252 |
| 5,530,680 A | | 6/1996 | Whitehurst .................. 367/99 |
| 5,533,383 A | | 7/1996 | Greene et al. .................. 73/40.5 A |
| 5,535,150 A | | 7/1996 | Chiang |
| 5,546,807 A | | 8/1996 | Oxaal et al. .................. 73/606 |
| 5,555,200 A | | 9/1996 | Chiang |
| 5,555,534 A | | 9/1996 | Maslak et al. .................. 367/135 |
| 5,590,658 A | | 1/1997 | Chiang et al. |
| 5,623,930 A | | 4/1997 | Wright et al. |
| 5,685,308 A | | 11/1997 | Wright et al. |
| 5,822,276 A | | 10/1998 | Miklovic .................. 367/103 |
| 5,825,898 A | | 10/1998 | Marash .................. 381/92 |
| 5,894,450 A | | 4/1999 | Schmidt et al. .................. 367/134 |
| 5,904,652 A | | 5/1999 | Gilbert et al. .................. 600/447 |
| 6,084,827 A | | 7/2000 | Johnson et al. .................. 367/103 |
| 6,111,816 A | | 8/2000 | Chiang et al. .................. 367/7 |
| 6,292,433 B1 | * | 9/2001 | Gilbert et al. .................. 367/138 |
| 6,359,834 B1 | * | 3/2002 | English .................. 367/133 |

OTHER PUBLICATIONS

Shott, J.D., et al., "Charge–coupled devices for use in electronically–focused ultrasonic imaging systems" 8049 Preceedings of the I.E.E.–F., vol. 127 (1980) Apr., No. 2, Stevenage.

Macovski, Albert, "Ultrasonic Imaging Using Arrays" Proceedings of the IEEE, vol. 67, No. 4, Apr. 1979.

Brady, J.J., "A serial phase shift beamformer using charge transfer devices," 8014 Journal of Acoustical Sty of America, vol. 68 (1980) Aug., No. 2, New York, NY 504–507.

Broadstone, S.R., et al., "Low–Power, High–Resolution 3D Sonar Imaging System," SPIE Conference, vol. 3711:57–67 (Apr. 1999).

Greening, M.V. et al., "Optimal linear sparse arrays," Defense Science and Technology Organization No date given.

Benjamin, K.C., "The Development of a Very Large, Dense Packed, Two–Dimensional, Ultrasonic Imaging Array," Paper presented at the $23^{rd}$ Synosium Acoustical Imaging, Boston, MA (Apr. 1997).

Kay, S.M., "Comments on Underwater Camera Design," pp. 1–10 (1999).

Impagliazzo, J., et al. "Prototype Sparse Arrays for 3D Sonar Imaging System," pp. 1–6.

Manzie, G., "High resolution acoustic mine imaging," Thomson Marconi Sonar Pty. No date given.

"Multi–Media Pentium II/III Ruggedized Notebook" MiTAC e–Centric Corp. Brochure.

"GETAC CA35 Ruggedized Tablet PC" MiTAC e–Centric Corp. Brochure.

* cited by examiner

SONAR BEAMFORMING SYSTEM

CROSS REFERENCES TO RELATED APPLICATIONS

The present application is a continuation-in-part of U.S. patent application Ser. No. 09/828,266 filed on Apr. 6, 2001 now U.S. Pat. No. 6,552,964 which claims priority to U.S. patent application Ser. No. 60/195,587 filed on Apr. 6, 2000 and U.S. patent application Ser. No. 09/842,311 filed on Apr. 25, 2001, the contents of these applications being incorporated herein by reference in their entirety.

BACKGROUND OF THE INVENTION

In numerous applications there is a need to perform sonar beamforming operations to acquire spatial information regarding a particular area of interest. Sonar systems make use of sensor arrays to process underwater acoustic signals to determine the location of a noise source. Array processing techniques for isolating received signals are known as beamforming and when the same or analogous principles are applied to focus the transmission of signals, the techniques are referred to as beamsteering. Various systems have been developed to perform such beamforming operations that frequently depend upon the particular applications.

One such application involves undersea search and survey that has various uses such as, but not limited to, terrain mapping and dredging operations. Further, undersea acoustic mine-field reconnaissance and mine hunting applications benefit from high-resolution imaging sonars for clutter rejection, obstacle avoidance, and identification of foreign objects. Currently, the discovery of underwater mines and obstructions is performed by touch in cold, murky water, often at night, under low-light conditions. Navy salvage, explosive ordinance disposal, and other military and civilian applications operate in zero-visibility water where "seeing with sound" using unmanned vehicles would make their jobs significantly more efficient and safer. Commercial applications which include, for example, commercial navigation or aiding search and rescue dive teams would benefit from an improvement in imaging systems.

There is still a need for a light-weight, low-power, low-cost, unmanned self-propelled sonar system for remote undersea imaging or surface imaging.

SUMMARY OF THE INVENTION

The system and method of the present invention is directed to a sonar imaging system. The system and method of the present invention can be used, for example, in a self-propelled vehicle using a compact, light-weight system with an internal power supply such as batteries supplying power to the system for the duration of a particular imaging operation. One application of the sonar beamforming system is for underwater detection and reconnaissance. In waters up to 150 meters deep it is often the most difficult for military and commercial applications, as personnel need to traverse water containing underwater mines and obstructions.

In accordance with a preferred embodiment, the sonar beamforming system and method of the present invention includes, for example, a forward-looking sonar for obstacle avoidance and undersea survey. The system includes one-dimensional transmit and receive transducer arrays with beamforming electronics, a computing controller such as, for example, a personal computer host controller. The arrays and beamforming electronics are packaged in an environmentally or hermetically sealed housing unit and mounted in at least the nose of an Unmanned Underwater Vehicles (UUV). The system and method of the present invention further includes at least one side-looking sonar, and preferably two side-looking sonars. The side-looking sonar system may include 32-element, one-dimensional arrays that are mounted on either side of the UUVs. Further, a downward-looking Bathymetric sonar may be mounted on the underside of the vehicle for high-resolution mapping.

In accordance with a preferred embodiment of the present invention, the sonar imaging systems such as, for example, the forward-looking scan, the side-looking sonar and downward-looking sonar use charge-domain-processing (CDP) such as charge coupled device (CCD/CMOS) integrated circuits that allow electronic lenses to focus reflected energy following detection by a one-dimensional array. The low power attributes of CCD/CMOS technology in beamformers facilitate the use of batteries to provide the life span of missions. Further, beamformers are used to emulate an acoustic lens for the sonar and are made smaller with fewer mechanical parts that are susceptible to failure. Electronic beamformers provide better imaging with minimal or no reflection artifacts.

The foregoing and other features and advantages of the sonar beamforming system and method will be apparent from the following more particular description of preferred embodiments of the system and method as illustrated in the accompanying drawings in which like reference characters refer to the same parts throughout the different views.

BRIEF DESCRIPTION OF THE DRAWINGS

Preferred embodiments of the present invention are described with reference to the following drawings, wherein.

DETAILED DESCRIPTION OF PREFERRED EMBODIMENTS

Figure 1:
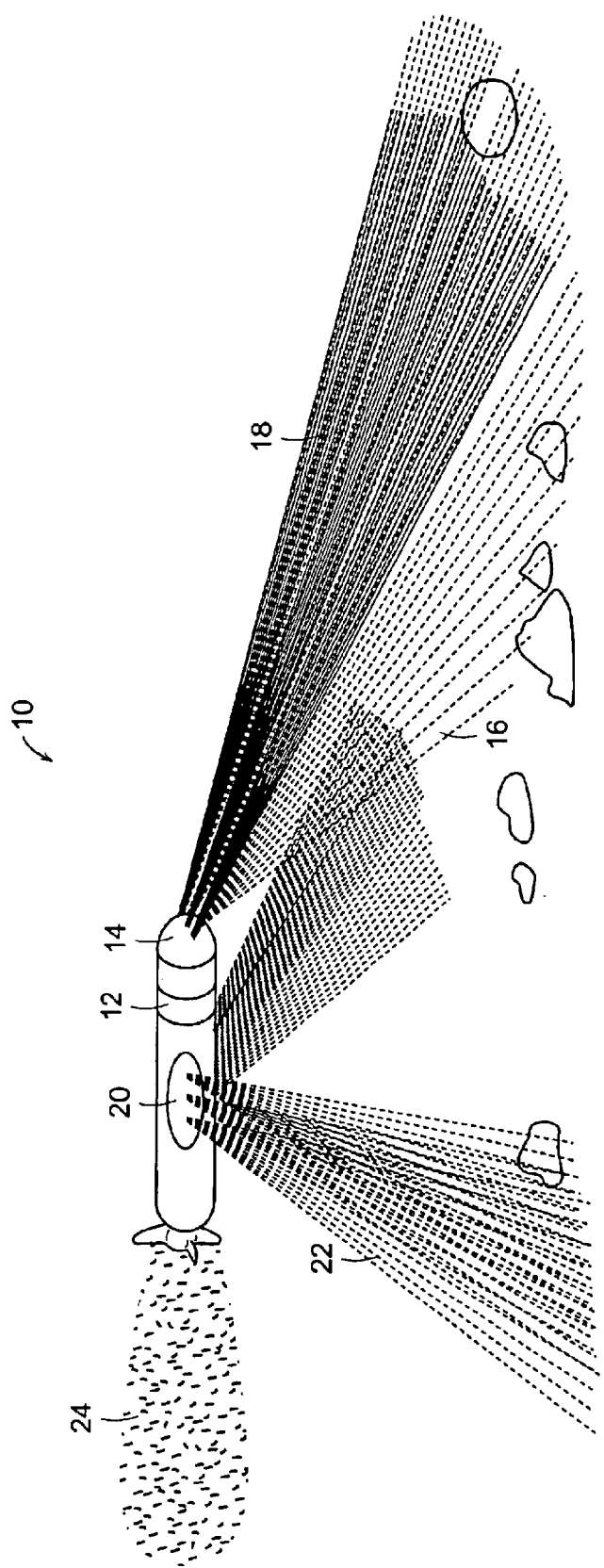
FIG. 1 is a diagram illustrating a preferred embodiment of a sonar beamforming system in accordance with the present invention.

Under water research scientists continue to seek small, low power acoustic sensor technology for transition to an Autonomous Unmanned Vehicle (AUV) or an Unmanned Underwater Vehicle (UUV) such as the Semi-Autonomous Hydrographic Reconnaissance Vehicle (SAHRV). High resolution is desired for undersea search and survey and to maximize the vehicles ability to perform target detection and classification. Existing multi-beam forward-looking sonars (FLS) with nominally half-degree resolution and greater than thirty degree field of view need to be improved to provide adequate imaging performance. The present invention is directed to a system and method for a sonar beamforming systems such as, for example, AUV's with FLS requiring substantially less power and volume than existing systems. This is accomplished by using programmable, low-power, high-throughput charge-domain-processing technology such as charge coupled devices (CCD/CMOS) integrated circuit technologies for electronic beamforming in conjunction with sonar arrays fabricated by, for example, Material Systems Technology (MSI). For example, at a 40 MHz clock rate, the beamformer provides a continuous computation throughput of approximately 10 billion operations per second and a delay update rate of approximately 22 billion bits per second and dissipates less than about 1 Watt of electric power.

The forward-looking sonar provides the vehicle's operational requirement for obstacle avoidance and search of the bottom area beneath the vehicle that is not covered by an additional side-scan sonar or side-looking sonar (gap-filler sonar). A high frequency multi-element curvilinear receive array is used in conjunction with separate acoustic projectors, one aimed straight ahead for obstacle avoidance and a separate projector aimed at a depression angle suitable for the gap-filler application.

In a preferred embodiment, the existing unfocused side-looking sonar (SLS) in underwater vehicles is replaced with a low power focused sonar. In a second preferred embodiment, a downward-looking sonar (DLS) capable of providing real-time Bathymetric surveys suitable for military and commercial ships to negotiate navigable routes into port is additionally provided. Each of the preferred embodiments of the beamforming systems is based on the CCD/CMOS integrated circuit technologies for electronic beamforming. Card assemblies are designed to maximize commonality among the subsystems. Replacing the existing SLS minimizes the power requirements of the suite of sonar sensors and minimizes the impact of the additional sonar sensors on the total vehicle cost.

An example of a low-cost autonomous underwater vehicle (AUV) for coastal monitoring and multiple vehicle survey operations is the Remote Environmental Monitoring UnitS (REMUS). In a preferred embodiment the vehicle is approximately 53 inches long with a body diameter of about 7.5 inches, although the length may be increased to support any reasonable payload. The AUV is neutrally buoyant, preferably weighing, without limitation, only 68 pounds in air, and is powered by sealed lead acid batteries. The vehicle can be operated in fresh or salt water. Because the preferred embodiment of the AUV is so small, it can be easily transported, launched and recovered from a small vessel and special handling equipment is not required.

Although small in size, the AUV vehicle is configured to support a variety of sensor packages. The vehicle has a conductivity/temperature/depth (CTD) sensor system and an optical backscatter sensor on board. Telemetry data provides time of day, depth, heading, and a geographic fix for the data.

Another preferred embodiment of the AUV includes a longer version of REMUS with an acoustic Doppler current profiler and Global Positioning System (GPS). Additional personal computer slots such as, for example, PC-104 slots and RS-232 ports are available for user-designed payloads.

In a preferred embodiment, the AUV has three motors forward of the propeller. The propulsion assembly is optimized to provide 1.5 pounds of thrust at a forward speed of four knots. At this speed a 40-nautical-mile track can be completed in 10 hours. A preferred embodiment of the AUV runs from a 24-volt power supply and draws approximately 32 watts while maneuvering through the ocean, enabling the vehicle to operate at four knots for 14 hours.

In a preferred embodiment the AUV control computer is based on PC-104 technology, a small form factor version of the common IBM-PC hardware. The Central Processing Unit (CPU) is housed in a custom motherboard, and has eight 12-bit analog to digital channels, input/output ports, power supplies, and other interface circuitry. Internally, the AUV runs at least one operating system program such as, for example, a DOS program written in C++ operating system program such as, for example, a DOS program written in C++ language that executes out of an autoexec.bat file. The vehicle user interface may run on a laptop computer.

A preferred embodiment of the AUV possesses an acoustical system with a digital signal processor. A receiving array of four hydrophones is located in the nose, and on the bottom is a hydrophone sensor that can both transmit and receive. To determine its position, the AUV transmits a coded ping to a transponder and listens for a reply. The range and bearing of the reply allows the AUV to determine its location. The AUV can be programmed to interrogate a plurality of transponders, approaching each transponder by minimizing the range. When the range to a transponder is below a predetermined threshold, the vehicle then listens on a different channel for the next transponder and approaches it using the same technique. By setting the transponders once using GPS, a known track line may be followed on subsequent imaging operations. This system be used to autonomously dock the vehicle.

In a preferred embodiment, the specifications of the AUV are described in Table 1 as follows:

TABLE 1

| Parameter | Approximate Dimensions |
|---|---|
| Length | 53 inches (1.3) |
| Beam | 5.5 feet |
| Diameter | 7.5 inches (19.1 cm) |
| Maximum Operating Depth | 492 feet (150 m) |
| Gross Weight | 68 lbs. in the air, neutrally buoyant in water |
| Dive Duration | 14 hours at 4 knots |
| Propulsion | Three motors; one direct drive thruster and sprocket driven rudder, two pitch motors, and one stem propeller |
| Power requirements | 24-volt supply, 32 watts while maneuvering at 4 knots |
| Power Source | Rechargeable lead acid batteries |

FIG. 1 is a diagram illustrating a preferred embodiment of a sonar beamforming system 10 as implemented in an AUV in accordance with the present invention. The system 10 includes a forward-looking sonar (FLS) 14 having forward-looking sonar transmit beams 16 and forward-looking sonar receive beams 18. The following are exemplary values for the forward-looking sonar:

TABLE 2

| Parameter | Approximate Dimensions |
|---|---|
| Operating frequency | 500 KHz–1.2 MHz |
| Beam resolution | <1 degree |
| Field of view | >30 degrees |
| Number of elements | Minimum of 128, preferably 128 or 192 |

TABLE 2-continued

| Parameter | Approximate Dimensions |
| --- | --- |
| Aperture | >14 cm |
| Element pitch | (0.5 lambda) |
| Image ranges | 3 to 5, 10, 20, 40 or 60 m |
| Independent beams | 64 |
| Range resolution | <1 cm |

The forward-looking sonar has a capability of at least 0.5 azimuth resolution, 30° Field of Vision (FOV); and reducing volume and power requirements by about one third such as, for example, 700 cubic inches and a range of 25 to 100 watts.

In a preferred embodiment, the forward-looking sonar comprises bistatic transducer arrays, preamplification and beamforming electronics and a commercially available computer. Further, an industry-standard personal computer such as PC-104 computer and a high speed serial bus such as, for example, without limitation, Institute of Electrical and Electronics Engineers, Inc. (IEEE) 1394 or Universal Serial Bus (USB) 2.0 peripheral interface provide for data collection and archiving of the data generated by the front-end beamforming electronics. The IEEE 1394 data transport bus supports both asynchronous and isochronous data. In another preferred embodiment, a parallel interface such as a peripheral component interconnect (PCI) may be used.

The system further includes at least one side-looking sonar (SLS) 20, and preferably two side scan or SLS sonars. Exemplary values of the side-looking sonar are as follows:

TABLE 3

| Parameter | Approximate Dimensions |
| --- | --- |
| Range | 2 m–50 m |
| Aperture | >40 cm |
| Frequency | 500 KHz–1 MHz |
| Beam width | <1 degree |
| Cross-range resolution | <0.2 m |

In a preferred embodiment, the side-looking scan or sonar consists of two multi-element receive arrays, preamplification and a single beamforming integrated circuit to realize a dynamically range-focused side-looking sonar system. The arrays, in a preferred embodiment, have 32 elements and are sized to have a vertical beamwidth of +/−30 degrees. A common aperture may be used for both the transmitter and receiver.

Another preferred embodiment includes multi-mode arrays such as, for example a first search and detection mode and a second high resolution target recognition mode. The beamformer is integrated with onboard processing which enables automatic obstacle detection and target recognition. Further, the arrays may be built directly on the hulls of the vehicles and then encapsulated as a single unit. This simplifies the fabrication process and minimizes, and preferably eliminates the need for expensive electrical feed through. Preamplifiers may optionally be incorporated in the encapsulation.

Acoustic communication devices 24 which are preferably steerable are also included in the system 10. These arrays may be fabricated by, for example, Material Systems Technology (MSI). Thus, the system 10 includes the integrated arrays—forward-looking sonar (FLS), side-looking sonar (SLS), and acoustic communication devices.

Figure 2:
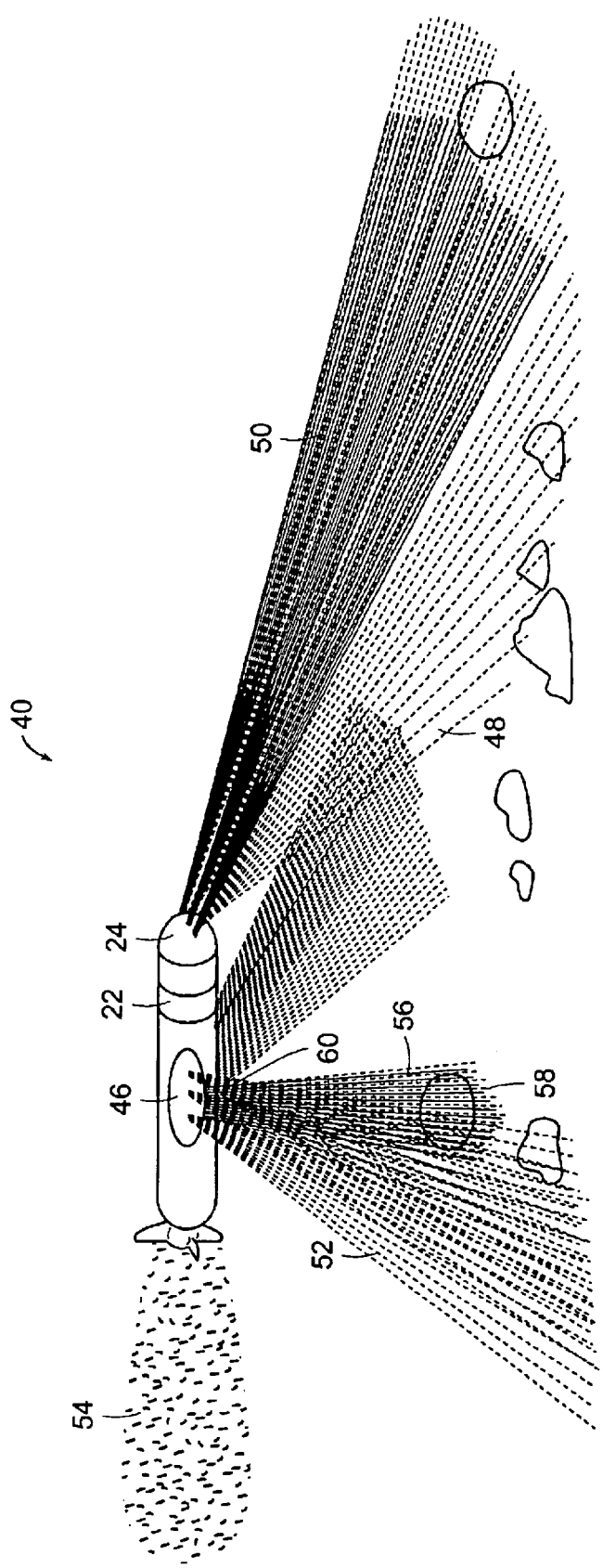
FIG. 2 is a diagram illustrating another preferred embodiment of a sonar beamforming system in accordance with the present invention.

FIG. 2 is a diagram illustrating another preferred embodiment of a sonar beamforming system 40 in accordance with the present invention. This system 40 includes a forward-looking sonar 44 having forward-looking sonar transmit beams 48 and forward-looking sonar receive beams 50. In addition, the system 40 has two side scan sonars 46 having side-looking sonar transmit beams 52. Further acoustic communication devices 54 which are preferably steerable are also present in this preferred embodiment of the system. At least one identification sonar 60 or a downward-looking Bathymetric Sonar is also mounted on the underside of the vehicle that transmits beam 58 and receives beams 56. This Bathymetric sonar 60 is a downward-looking sonar (DLS) for high-resolution terrain mapping and object identification.

In a preferred embodiment, the downward-looking sonar 60 is made with a similar construction as the forward-looking sonar and is housed in its own replaceable hull section. This allows the UUV to adapt to imaging operation requirements by adding payload sections as needed. The downward-looking sonar is cylindrically shaped and is conformed to the vehicle hull. As it is preferably, but without limitation, housed in its own section, the surfaces of the arrays are flush with the hull as there is no mechanical interference with the on-board systems. The arrays thus are conformal and are not appendages protruding from the vehicle that can be damaged during deployment, operation or retrieval. The downward-looking sonar array preferably includes, but is not limited to, a single element projector to provide the illumination for a 128-element receiver array 58. The 128 elements may be each spaced a distance of $0.5\lambda$ apart to minimize grating lobes.

In a preferred embodiment, the FLS is housed in a replaceable nose cone, the SLS is conformed on a hull section of the vehicle and the DLS is fabricated in its own hull section.

Figure 3:
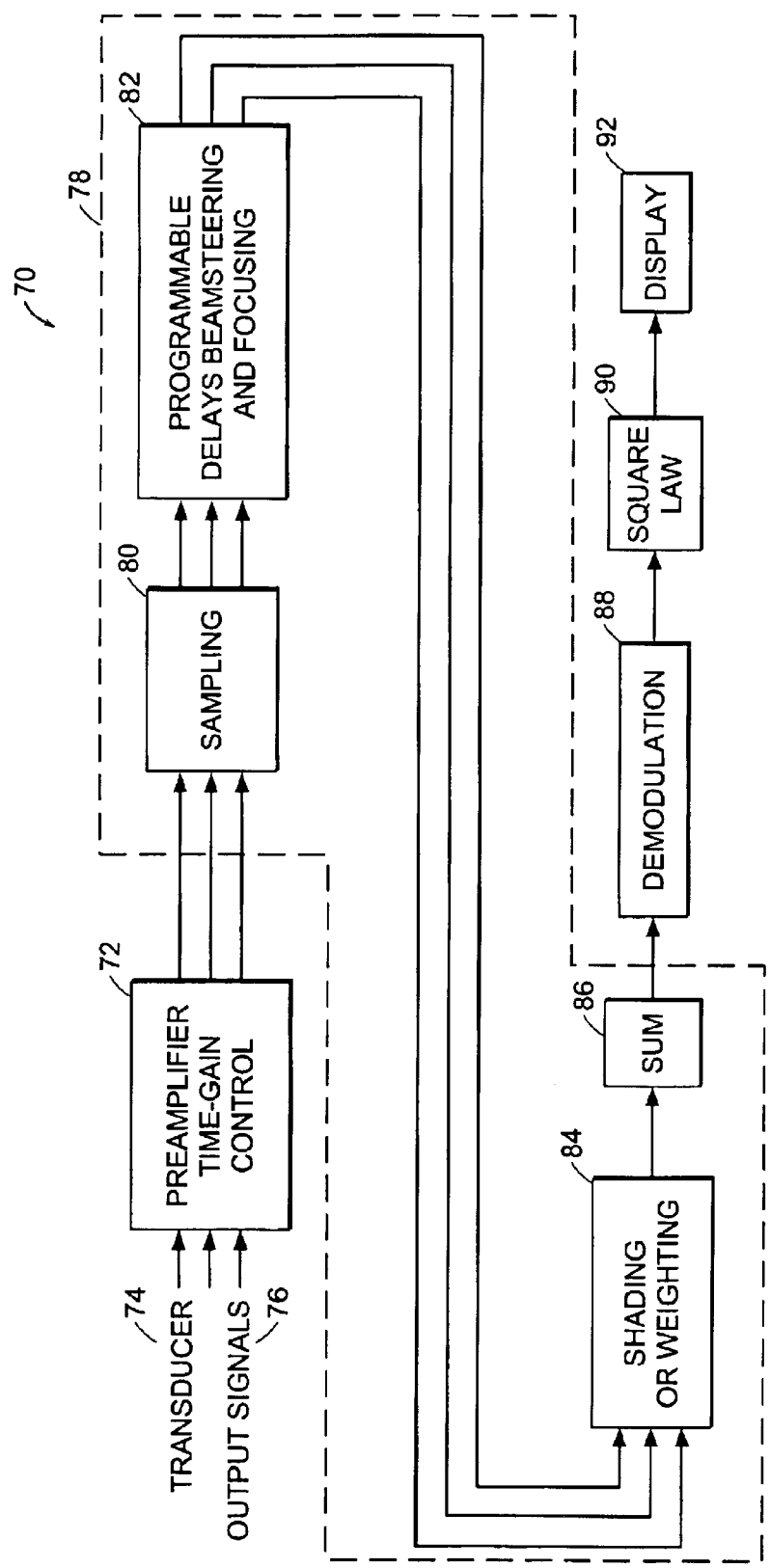
FIG. 3 is a block diagram illustrating an electronic focusing sonar imaging system in accordance with a preferred embodiment of the present invention.

FIG. 3 is a block diagram illustrating an electronic focusing sonar imaging system 70 in accordance with a preferred embodiment of the present invention. Signals such as transducer signal 74 and output signals 76 from the input to a low noise preamplifier 72 having time-gain control. The output of the preamplifier 72 forms the input into a sampling subsystem 80. The output of the sampler forms the input to programmable delays 82 associated with beamsteering and focusing functions, the output of which forms an input into a weighting subsystem 84. The outputs of the weighting function are then summed in a summer 86. In a preferred embodiment the sampler 80, the programmable delays 82, the weighting function 84 and summer 86 functions are integrated on a single chip 78 which accomplishes beamforming, preferably using a charge-domain-processing (CDP) structure. A preferred implementation of a beamforming device using CDP technology, including a programmable tapped delay line structure, is described in a co-pending PCT International Application Number PCT/US98/02291, filed on Feb. 3, 1998, by Jeffrey Gilbert, Alice Chiang, and Steven Broadstone, the entire contents of which is hereby incorporated by reference.

In a CDP circuit, sampled information is represented by analog charge packets. If the information is accurate to 10-bit words, instead of representing it by 10 separate digital bits, each charge packet represents a 10-bit value and these charge packets can be manipulated at a high speed with a high level of accuracy, for example, approximately 10-bit, in a very small chip area. The CCDs of the present invention have a charge sensing method that eliminates clock feed-through. Furthermore, a charge domain multiplier that maintains the output accuracy to more than 8-bits is also included. The CCD signal processors have an output dynamic range of at least 60 dB. The CDP technology used in the systems of the present invention combine high speed, low-power charge-domain units with conventional CMOS digital control and memory circuits.

The output of the summer 86 forms the input to a demodulator 88, whose output is manipulated in a square law function 90. The output of the square law function 90 forms the input of a display 92 such as a monitor.

Figure 4:
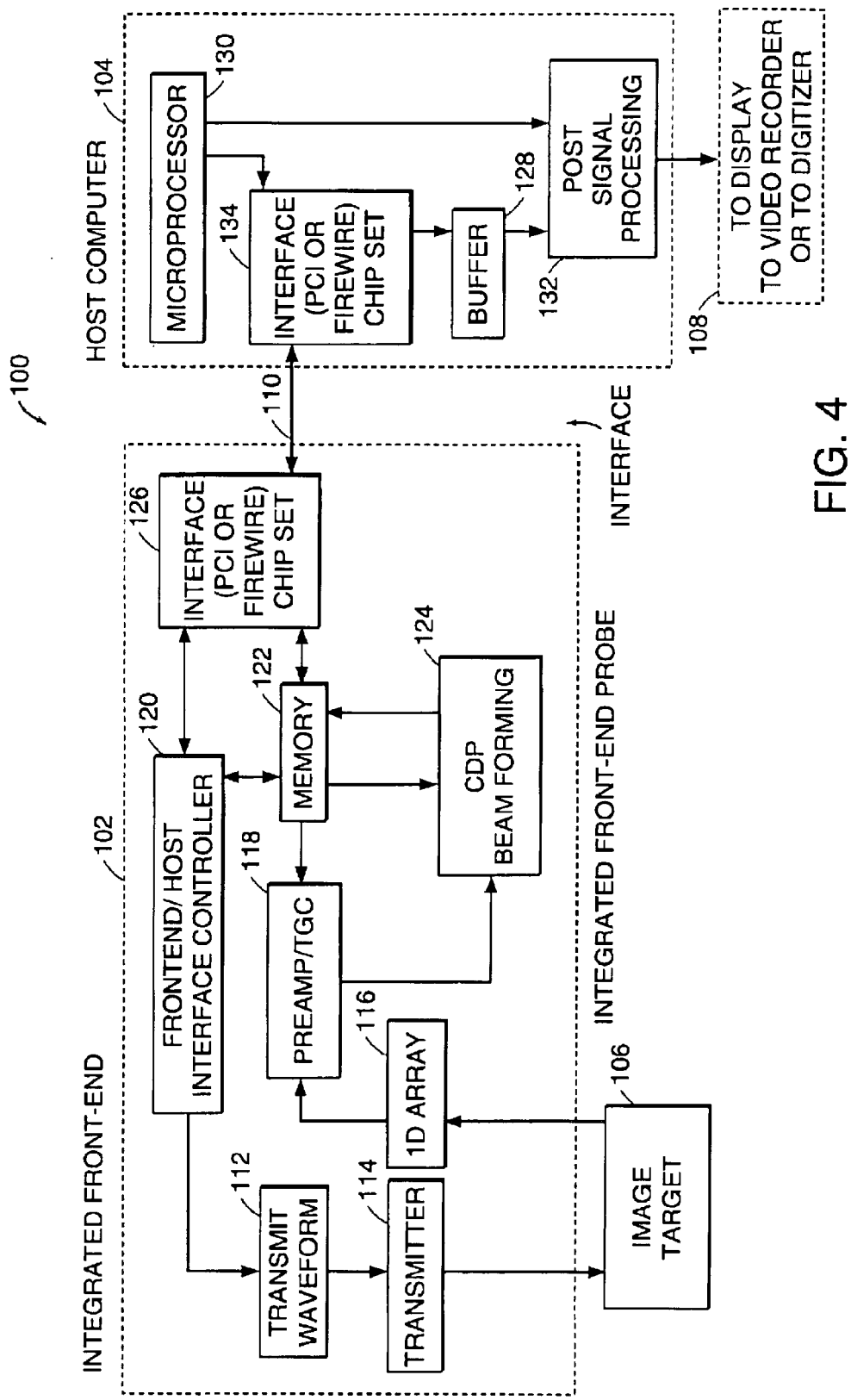
FIG. 4 is a block diagram illustrating a sonar imaging system in accordance with another preferred embodiment of the present invention.

FIG. 4 is a block diagram illustrating a sonar imaging system 100 in accordance with another preferred embodiment of the present invention. The imaging system 100 includes a front-end 102 which interfaces with a back-end host computer 104. The front-end electronics including the beamformer is mounted on small-sized printed circuit boards that can be completely housed in the nose of the UUV, for example. The output of the back-end provides the input to a display system 108 or is downloaded via ethernet to a display platform.

The front-end 102 of the system 100 is an integration of many subsystems. A waveform transmit function 112 forms an input to a transmitter 114 which in turn transmits waveforms to a target image 106. An array 116 is received at the front-end 102 from the target image and is then processed in the front-end. The array in a preferred embodiment is a one-dimensional array. The processing signals of the received array begins with preamplification in a low noise preamplifier 118 having time-gain control. The output of the preamplifier 118 forms the input into a beamforming function 124, preferably using CDP. A memory device 122 interfaces with the preamplifier 118 and the beamformer 124. The memory device 122 may be a single memory device or plurality of memory devices. Such a memory device may be, but is not limited to, a random access memory, read-only memory, floppy disk memory, hard drive memory, extended memory, magnetic tape memory, zip drive memory and/or any device that stores digital information. A front-end host interface processing module or controller 120 interfaces with the memory 122. The controller 120 may be a single processing device or a plurality of processing devices. Such a processing device may be a microprocessor, microcomputer, digital signal processor, central processing unit of a computer or work station, digital circuitry, state machine, and/or any device that manipulates signals, for example, analog and/or digital, based on operational instructions. It should be noted that when the processing module implements one or more functions, via a state machine or logic circuitry, the memory storing the corresponding operational instructions is embedded within the circuitry comprising the state machine or logic circuitry. A standard interface such as, for example, a high-speed serial bus IEEE 1394/Fire Wire® chip set 126 interfaces with both the host interface controller 120 and the memory 122.

Thus, in a preferred embodiment, the forward-looking sonar is comprised of bistatic transducer arrays, preamplification and beamforming electronics and a commercially available computer. An industry-standard personal computer such as PC-104 computer and a high-speed serial bus such as IEEE 1394 peripheral interface provide for data collection and archiving of the data generated by the front-end beamforming electronics. The PC-104 computer and its disc driver, memories, input/output, the high-speed serial bus (IEEE 1394) interface are integrated into a hermetically sealed portion of the AUV or UUV. Data is retrieved by connecting through a standard Ethernet interface mounted on the body of the vehicle.

The back-end 104 includes a microprocessor 130 that sends inputs to an Interface chip (IEEE 1394) 134 and then to a buffer 128 and a post signal processor 132. The FireWire®(IEEE 1394) chip set 126 in the front-end 102 interfaces with the interface chip set 134 in the back-end through an interface 110. The back-end preferably includes a receiving parallel data bus interface, for example, PCI or a serial bus interface, for example, a FireWire® chip set 134. The buffer 128 interfaces with the post signal processor 132. Further details regarding interface structure can be found in U.S. application Ser. No. 09/791,491 filed on Feb. 22, 2001, the entire contents of which is incorporated herein by reference.

The output of the back-end 104 forms the input into a display 108 such as at least, without limitation, a monitor, a video recorder and/or a digitizer. The system of the present invention permits real-time analysis of data to assess the images as well as permits data analysis via post collection.

Figure 5:
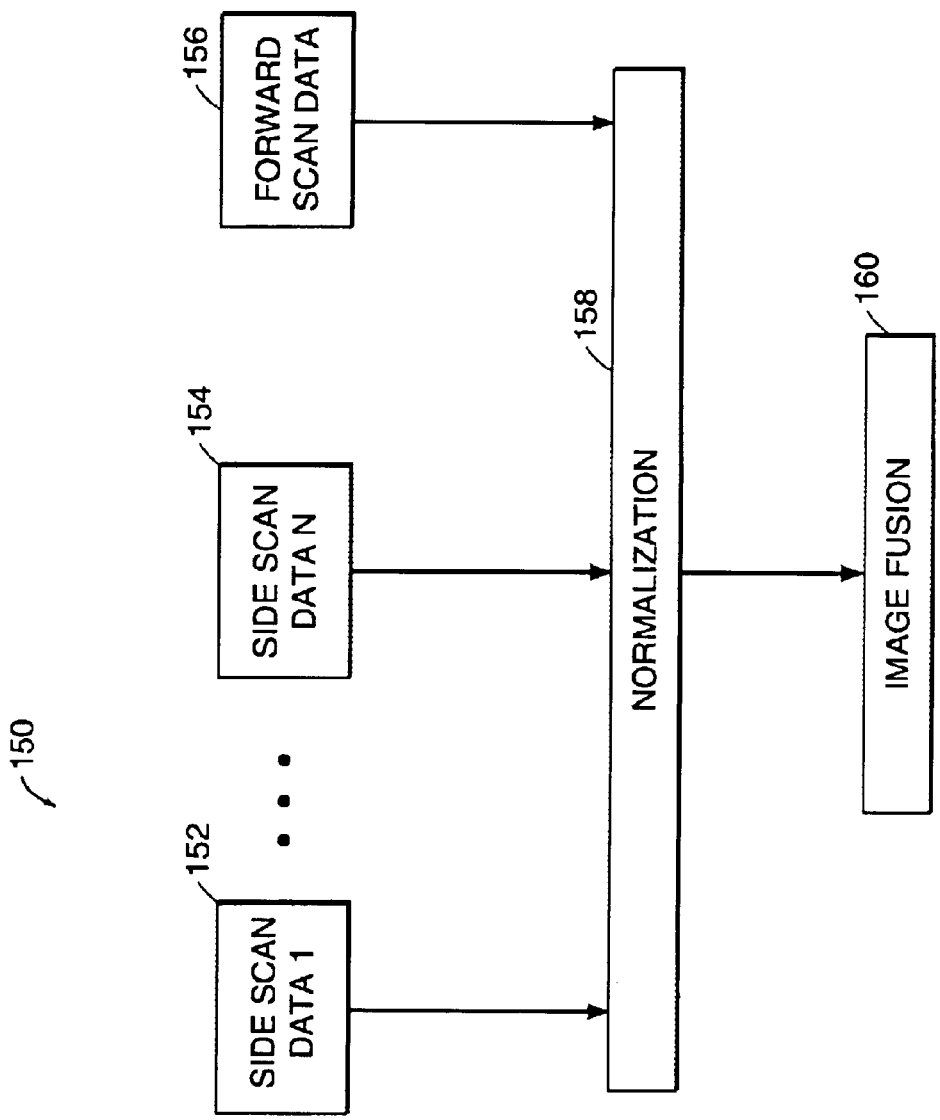
FIG. 5 is a block diagram illustrating a flow chart of the image fusion process of the sonar imaging system in accordance with a preferred embodiment of the present invention.

FIG. 5 is a block diagram illustrating a flow chart of the image fusion process 150 of the sonar imaging system in accordance with a preferred embodiment of the present invention. Data from at least one side scan 152 are meshed with forward scan 152, 154 data 156 derived from a forward-looking scan such as described with respect to FIGS. 1 and 2. This data from the side scan and the forward scan are first normalized or scaled in a normalizing process 158. The process of normalization addresses spatial resolution. This normalization process is preferably performed, without limitation, on a standard personal computer platform. The fan shaped data is then meshed in an image fusion process 160. The data fusion process enables multi-sensor target classification and identification. The data fusion process may be accomplished, without limitation, using commercial products which provide three-dimensional rendering of data that is stacked such as, for example, 3D EchoTech that is provided commercially by EchoTech.

Figure 6:
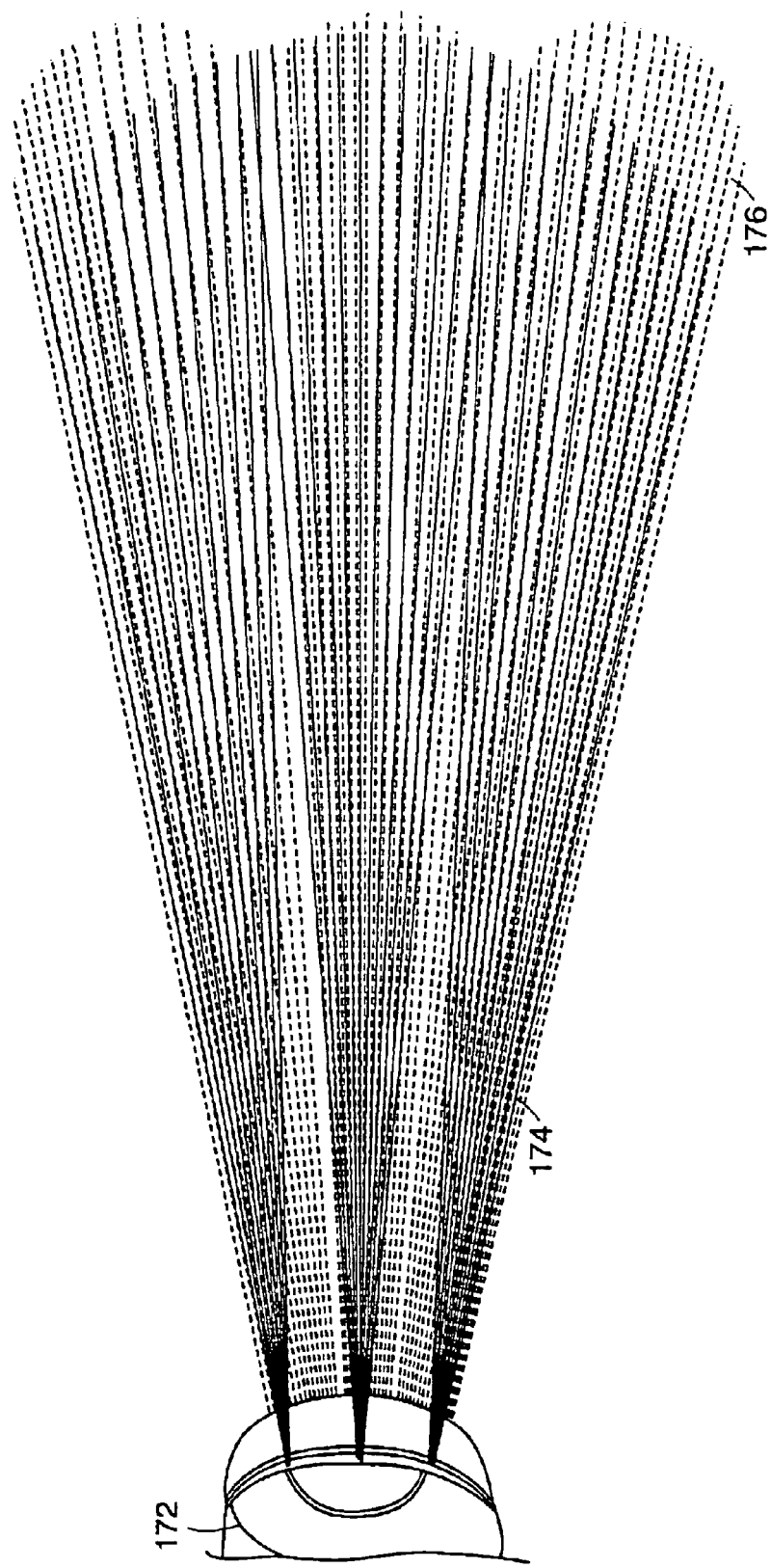
FIG. 6 is a schematic illustration of transmit and receive beam configurations of the sonar imaging system in accordance with a preferred embodiment of the present invention.

FIG. 6 is a schematic illustration of transmit and receive beam configurations of the sonar imaging system in accordance with a preferred embodiment of the present invention. The forward-looking sonar scan 172 includes at least one transmit beam 174, and preferably multiple receive beams. The receive beams are discrete beams such as, for example, beam 176.

Figure 7:
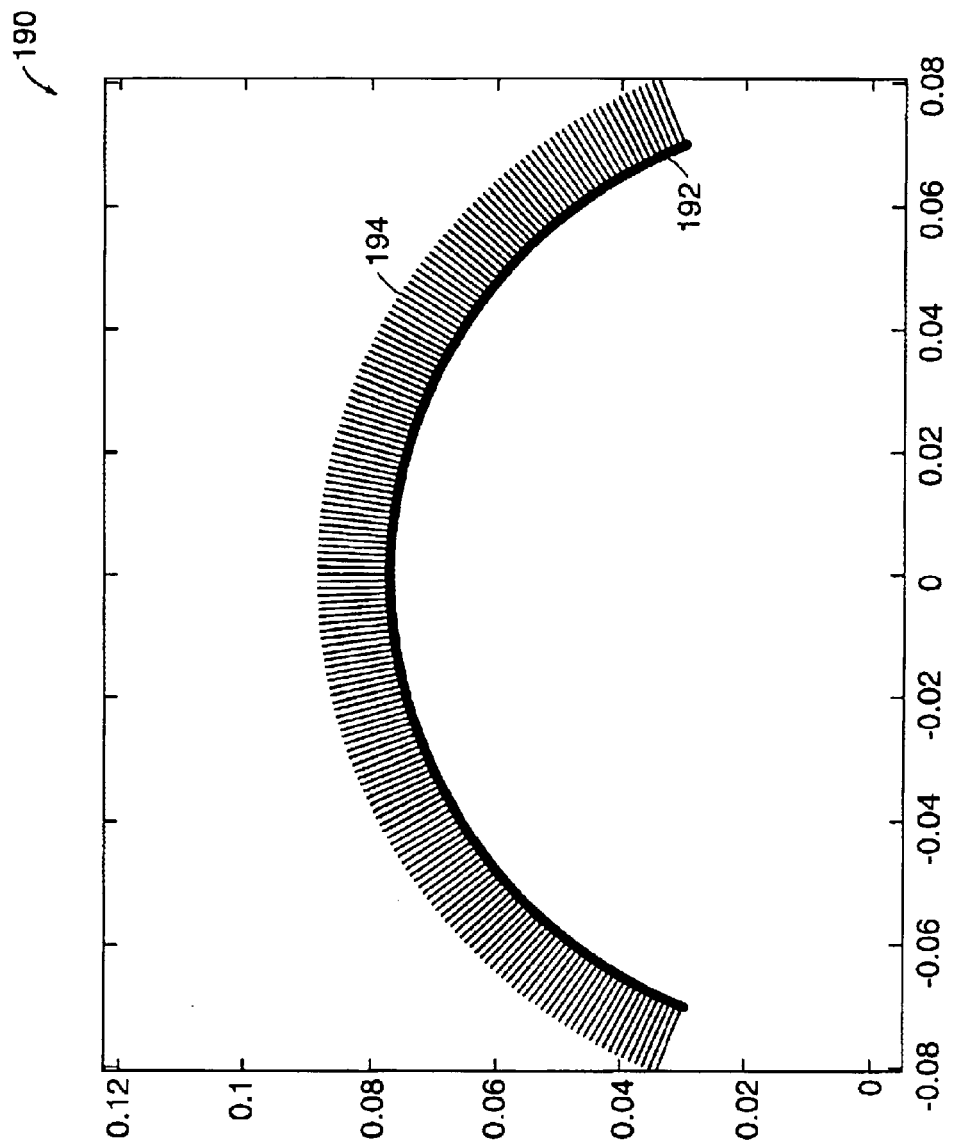
FIG. 7 is a graphical illustration of a curvilinear array of a sonar imaging system in accordance with a preferred embodiment of the present invention.

FIG. 7 is a graphical illustration 190 of a curvilinear array of a sonar imaging system in accordance with a preferred embodiment of the present invention. An ultrasound absorbent backing layer 192 is used to generate a transducer frequency response with a wide bandwidth. The curvilinear array has a plurality of ultrasound elements 194. The FLS curvilinear receive array has a center frequency between 500 Hz to 1 MHz with 192 elements.

The performance of the FLS is a function of the array's design frequency and aperture. The aperture is limited by the diameter of the vehicle, which may be 7.5 inches. In a preferred embodiment, a curvilinear array with approximately a 3.125-inch radius is recommended. This radius allows the array to be encapsulated in a protective cover to protect against damage if the vehicle impacts an obstacle during an imaging operation. For this radius of curvature, the 3 dB beam width, or azimuth resolution in degrees, is determined by the arrays center frequency (Fo) and number of elements spaced at one-half wavelength spacing ($\lambda 2$).

In another preferred embodiment of the system of the present invention, the FLS curve linear receive array has a center frequency of 750 KHz with 128 elements, and a 3 inch radius of curvature. The transmit projector consists of a single element looking ahead for obstacle avoidance and a three element transmit array looking forward and downward for gap filling and navigation. The three-element projector array may be three discrete wide beam elements or a three element curved array.

The arrays consist of full-scale receiver and projector arrays mounted on a pressure plate and encapsulated in ρ-c polyurethane. A simple hemispherical shape is used in a preferred embodiment for the outer shape of the array. In yet preferred another embodiment of the present invention, the sonars are mounted on a pivotable mechanism to provide a sonar that provides for forward scan and side scans.

The system of the present invention is contemplated to have at least two modes of operation—an identification mode which provides a zoom capability and a detection mode which allows for a survey with a large range for scanning. The detection mode operates at a lower frequency as compared with the identification mode such as, for example, but not limited to, 500 KHz. This provides a longer range for scanning in the detection mode. The frequency is at least doubled for the identification mode and allows a zoom function. Thus a frequency shift allows for the two modes or operation.

The following table details an exemplary power estimate (Wattage/size) in accordance with a preferred embodiment of the system of the present invention:

TABLE 5

PC HOST CONTROLLER SUBSYSTEM

Processor: P133 with up to 126MB Memory and Mass Storage Power requirements: 10 W (effective), estimated size:
3.5 × 2 × 6 inch
BEAMFORMING ELECTRONICS SUBSYSTEM FLS power requirements (192 channels): 11 W (effective), estimated size:
9 × 6 × 1 inch
SLS power requirement (32 channels): 4 W (effective), estimated size:
3 × 6 × 1 inch
TRANSMITTER SUBSYSTEM FLS power requirements: 2.5 W (effective)
SLS power requirements: ~5 W (effective)

A preferred embodiment of the system includes the following design criteria:

SLS gap=+/−6 m

Typical mission duration 8 to 9 hours

Frame rate=1 image/second (AUV speed=2 m/second)

For range resolution=5.25 in. (match SLS); 64×256 class image covers 10 m.–44 m. (16 Kbyte file); Azimuth resolution=0.7° range/64; 9 hr mission raw data file=531 Mbytes.

Further preferred embodiments of the present invention provide mean and long range forward-looking sonar performance, short range focusing of the forward-looking sonar for high resolution classification, three-dimensional imaging with the forward-looking sonar, side-looking sonar with emphasis on short range focusing to minimize gap width, downward-looking sonar to define resolution and corridor width limitations for bathymetric surveys and downward-looking sonar three-dimensional imaging capabilities to evaluate image skew, and near field focusing update rate requirements.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, other embodiments in hardware or firmware implementations may alternatively be used, and vice-versa.

It will be apparent to those of ordinary skill in the art that methods involved in the sonar beamforming system and method may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A sonar beamforming system, comprising in combination:
    a forward-looking sonar having transmit and receive transducer arrays and a programmable beamforming device formed on a single integrated circuit; and
    at least one side-looking sonar having multi-element arrays and a second beamforming device formed on a second single integrated circuit.

2. The system of claim 1, further comprising a downward-looking sonar having sufficient resolution for terrain mapping and object identification.

3. The system of claim 1, wherein at least one of the forward-looking sonar and at least one side sonar are mounted on a pivotable motorized array.

4. The system of claim 1, wherein at least one of the forward-looking sonar and the side-looking sonar include multi-mode arrays for at least a detection mode and an identification mode.

5. The system of claim 1, wherein the system further comprises multi-element acoustic communication receive arrays.

6. A water craft, comprising in combination at least one of:
    a forward-looking sonar having a transmit and receive transducer array and a programmable beamforming device formed on a single integrated circuit; and
    a side-looking sonar having multi-element arrays and a beamforming device formed on a second single integrated circuit.

7. A forward-looking sonar comprising in combination:
    a bistatic transducer array having a first transmit transducer array and a second receive transducer array;
    a beamforming device formed on a single integrated circuit; and
    a processing unit.

8. A method for forming an integrated image comprising the steps of:

obtaining array signals from a forward-looking sonar having a programmable beamformer circuit formed on a single integrated circuit;

obtaining array signals from at least one side-looking sonar;

normalizing the array signals from the forward-looking sonar and the at least one side-looking sonar to generate normalized data using a personal computer platform; and fusing the normalized data to generate an image.

9. An underwater unmanned vehicle system comprising in combination:

a forward-looking sonar having a transmit and receive transducer array and a beamforming device formed on a single integrated circuit; and at least one side-looking sonar having a second transducer array and a beamforming device formed on a second integrated circuit.

10. The system of claim 9, further comprising a downward-looking sonar having sufficient resolution for terrain mapping and object identification.

11. The system of claim 9, wherein at least one of the forward-looking sonar and at least one side sonar are mounted on a pivotable motorized array.

12. The system of claim 9, wherein at least one of the forward-looking sonar and the side-looking sonar include multi-mode arrays for at least a detection mode and an identification mode.

13. The system of claim 9, wherein the system further comprises multi-element acoustic communication receive arrays.

14. The system of claim 9, wherein the beamforming device further comprises a plurality of charge domain delay lines.

15. The system of claim 9, wherein the beamforming device comprises a sampling circuit connected to a programmable delay circuit, a weighting circuit, and a summing circuit.

16. The system of claim 9, further comprising a memory circuit connected to the beamforming device.

17. The system of claim 16, further comprising an interface controller connected to the memory circuit.

18. The system of claim 17, further comprising a high speed data bus interface connected to the interface controller and the memory circuit, the high speed data bus interface communicating with the central processor.

19. The system of claim 9 wherein the beamforming device comprises a charge domain delay line.

20. The system of claim 19 further comprising a plurality of charge coupled device delay lines, each delay line having a programmable tap selection circuit.

21. The system of claim 1, wherein the beamforming device comprises a sampling circuit, a programmable delay circuit and a summing circuit.

22. The system of claim 21, further comprising a memory circuit in communication with the beamforming device.

23. The system of claim 4, wherein the identification mode has a first frequency that is at least twice a second frequency of the detection mode.

24. The forward-looking sonar of claim 7, wherein the beamforming device comprises a sampling circuit, a programmable delay circuit and a summing circuit.

25. The forward-looking sonar of claim 24, further comprising a memory circuit in communication with the beamforming device.

26. The method of claim 8, wherein the step of obtaining array signals from a forward-looking sonar further comprises disposing at least one curvilinear receive array.

27. The method of claim 26, wherein the radius of the curvilinear array is approximately at least 3 inches.

28. The method of claim 8, further comprising obtaining array signals from a downward looking sonar and fusing the normalized data with data generated from the array signals obtained from the downward looking sonar to provide for depth resolution.

29. The method of claim 26, wherein a first curvilinear array provides for obstacle avoidance and a second curvilinear array provides for gap-filling.

30. The method of claim 8, wherein the image is a three-dimensional bathymetric image.

31. The system of claim 17, wherein the high speed data bus interface comprises a high speed serial data bus interface.

32. The system of claim 17, wherein the high speed data bus interface comprises a high speed parallel data bus interface.

* * * * *